United States Patent [19]
Boshinski et al.

[11] 3,741,324
[45] June 26, 1973

[54] WEIGHING SCALE WITH DIGITAL DISPLAY

[75] Inventors: Edwin E. Boshinski, Englewood; Walter W. Clark, Xenia; Roger W. Riehl; William M. Watson, both of Troy, all of Ohio

[73] Assignee: The Hobart Manufacturing Company, Troy, Ohio

[22] Filed: May 3, 1971

[21] Appl. No.: 139,372

[52] U.S. Cl. ............... 177/3, 177/25, 177/DIG. 1, 177/DIG. 3
[51] Int. Cl. .............................. G01g 23/38
[58] Field of Search .......................... 177/3-5, 177/25, 210, 12, DIG. 3, DIG. 1, 177, 178; 235/61 PS, 58 PS, 151.33

[56] References Cited
UNITED STATES PATENTS

| | | | |
|---|---|---|---|
| 3,163,247 | 12/1964 | Bell et al. | 177/3 |
| 3,608,655 | 9/1971 | Ray et al. | 177/5 |
| 3,439,760 | 4/1969 | Allen | 177/3 |
| 3,447,617 | 6/1969 | Susor et al. | 177/3 |
| 3,289,777 | 12/1966 | Willyard | 177/3 |
| 3,130,802 | 4/1964 | Bell | 177/12 |
| 3,276,526 | 10/1966 | Loshbough | 177/12 |
| 3,439,760 | 4/1969 | Allen | 235/58 PS |
| 3,459,272 | 8/1969 | Susor | 177/4 |
| 3,576,099 | 4/1971 | Walton | 58/50 |
| 3,653,015 | 3/1972 | Rock | 177/25 |

FOREIGN PATENTS OR APPLICATIONS

| | | | |
|---|---|---|---|
| 1,226,808 | 2/1960 | France | 177/178 |
| 153,183 | 9/1953 | Australia | 177/3 |
| 476,095 | 12/1937 | Great Britain | 177/178 |
| 481,482 | 3/1938 | Great Britain | 177/178 |
| 695,635 | 8/1953 | Great Britain | 177/177 |
| 548,191 | 9/1956 | Italy | 177/177 |

Primary Examiner—Richard B. Wilkinson
Assistant Examiner—Stanley J. Witkowski
Attorney—Lawrence B. Biebel et al.

[57] ABSTRACT

A weighing scale having a vertical housing with front and back walls includes electronic means for displaying visually the price per unit weight and the total price of goods placed on the scale platform. The housing also includes an optical chart, having human recognizable and machine recognizable indicia representing the weight of the goods placed on the scale platform, which moves through a distance proportional to the weight of the goods. Optical paths are provided to display visually the weight of the goods on ground glass plates mounted to be visible through the front and back walls, and a third optical path directs the machine recognizable indicia onto photodetectors to provide an electrical representation of the weight of the goods. An electronic computer within the scale computes the total value of the goods and displays this information visually, along with price per unit weight information provided by a manually operated keyboard, on electronic readout tubes.

5 Claims, 13 Drawing Figures

PATENTED JUN 26 1973 3,741,324

INVENTORS
EDWIN E. BOSHINSKI,
WALTER W. CLARK,
ROGER W. RIEHL &
WILLIAM M. WATSON

BY Marechal, Biebel, French & Bugg
ATTORNEYS

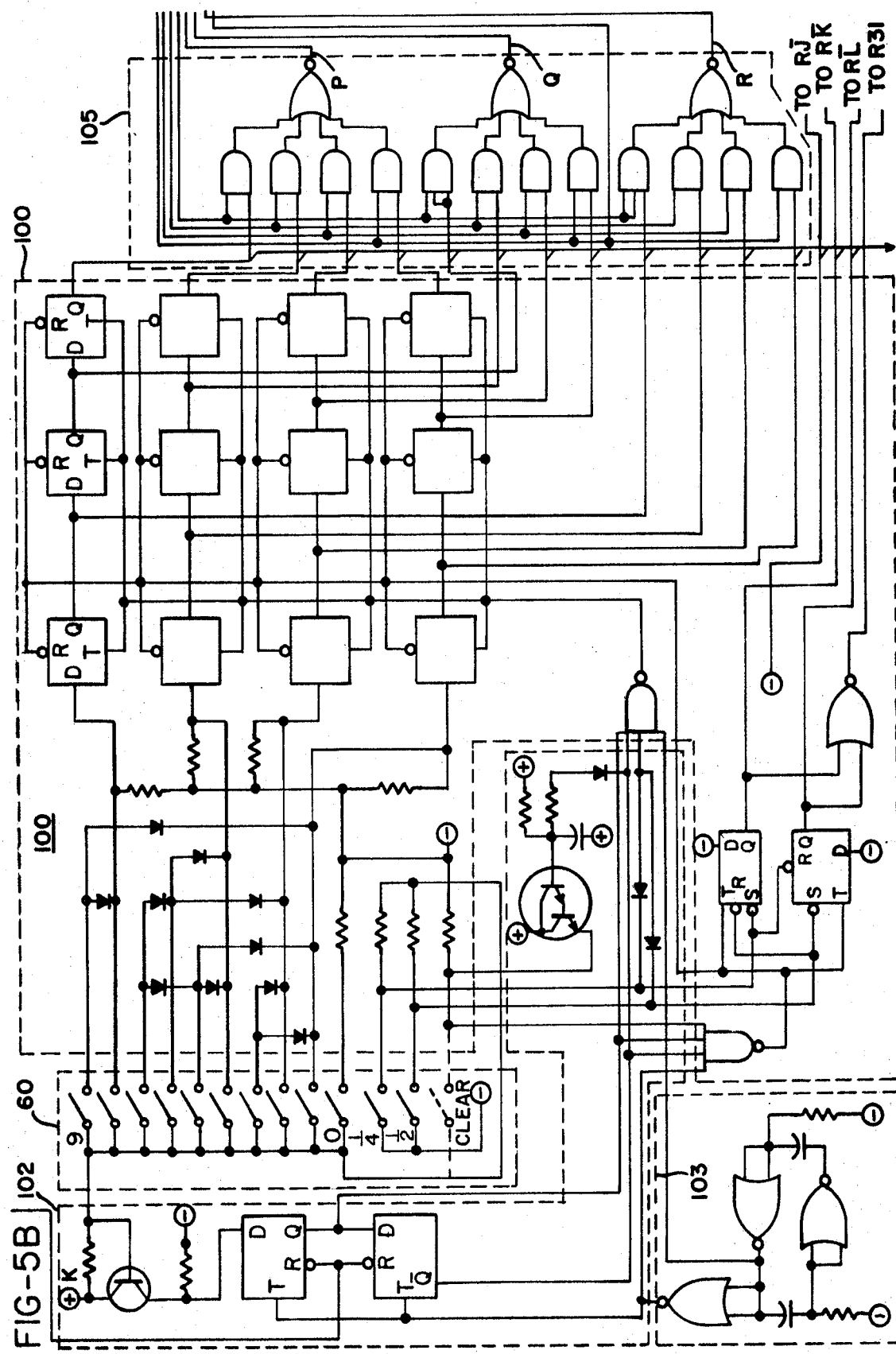

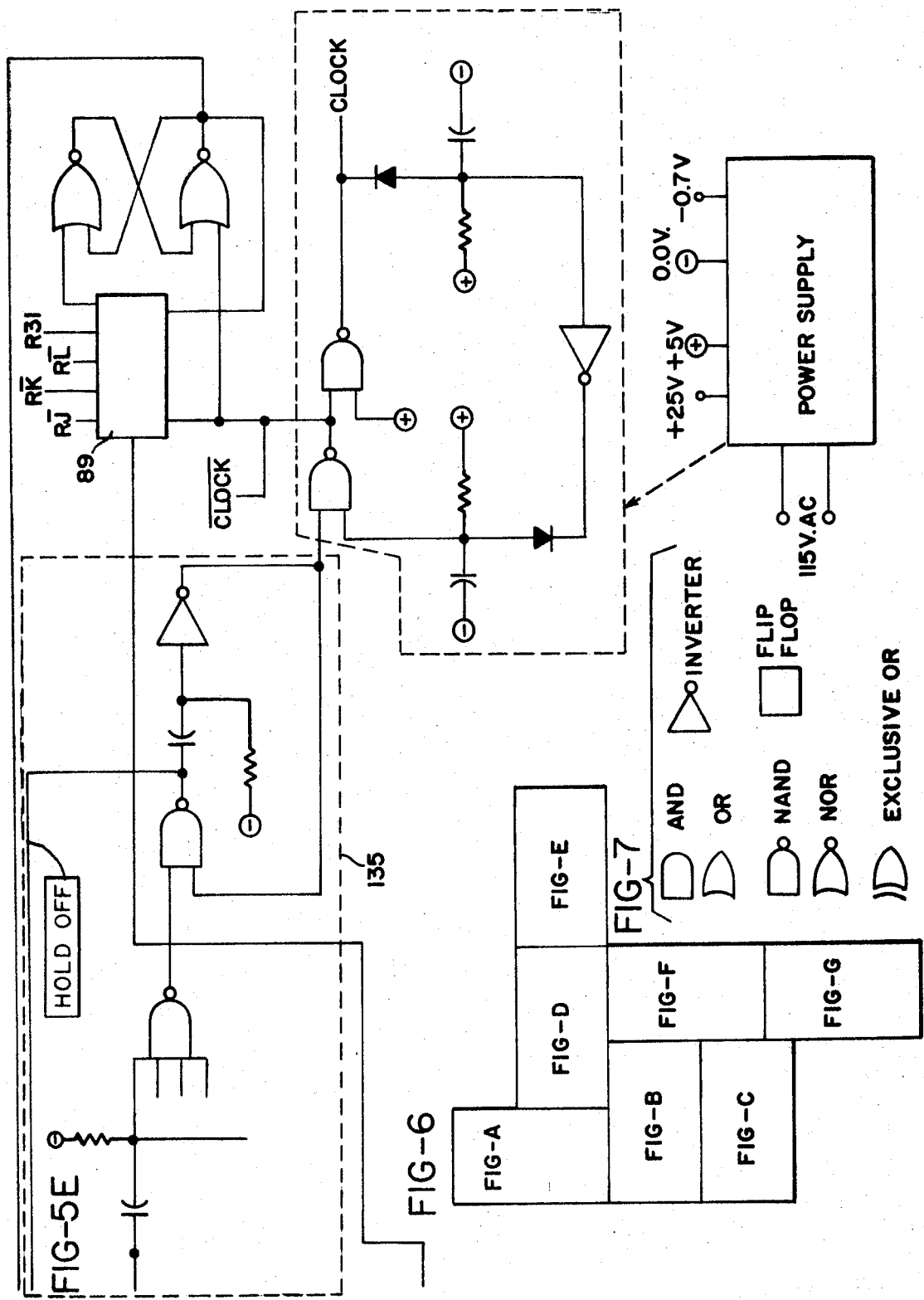

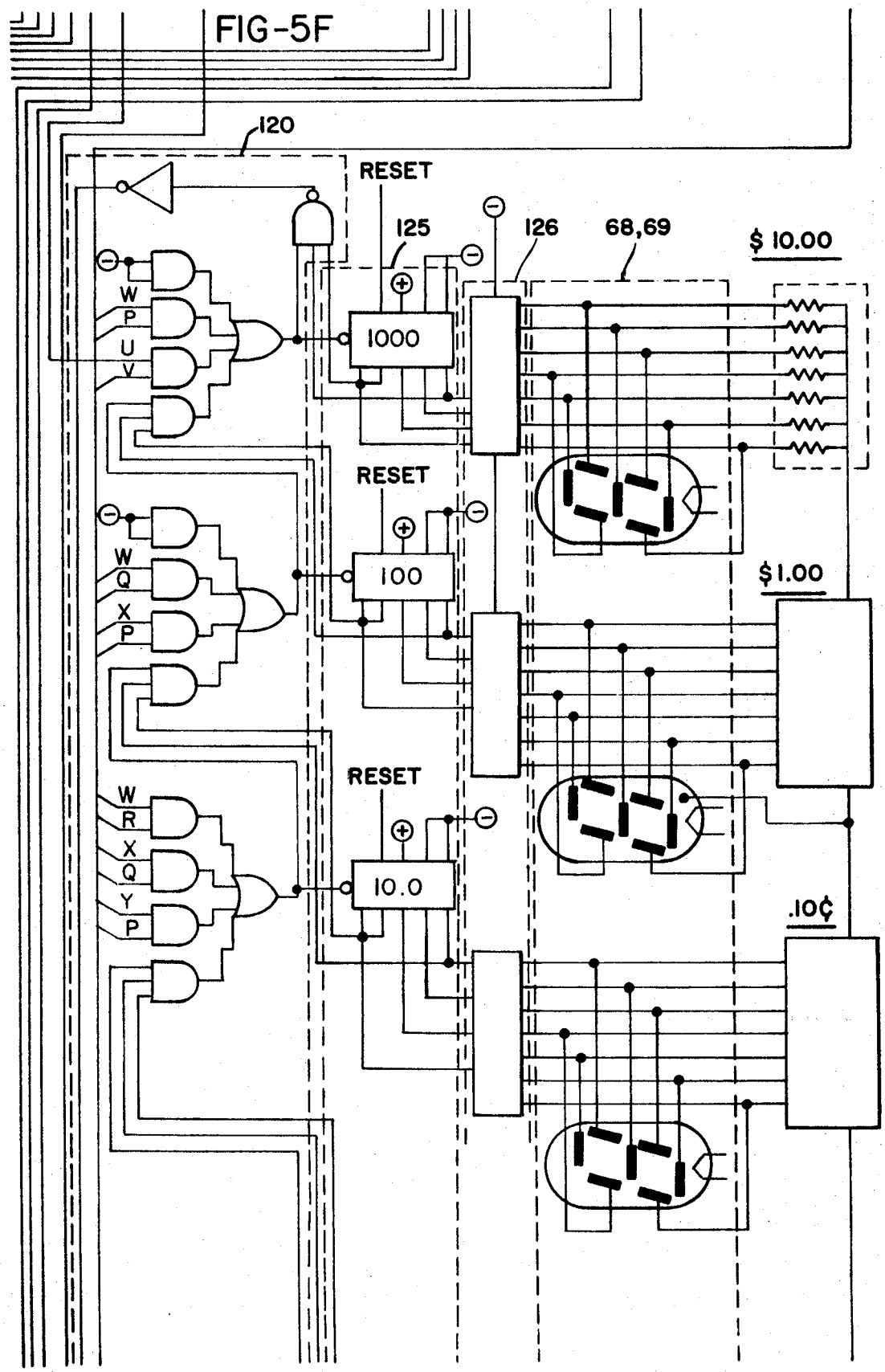

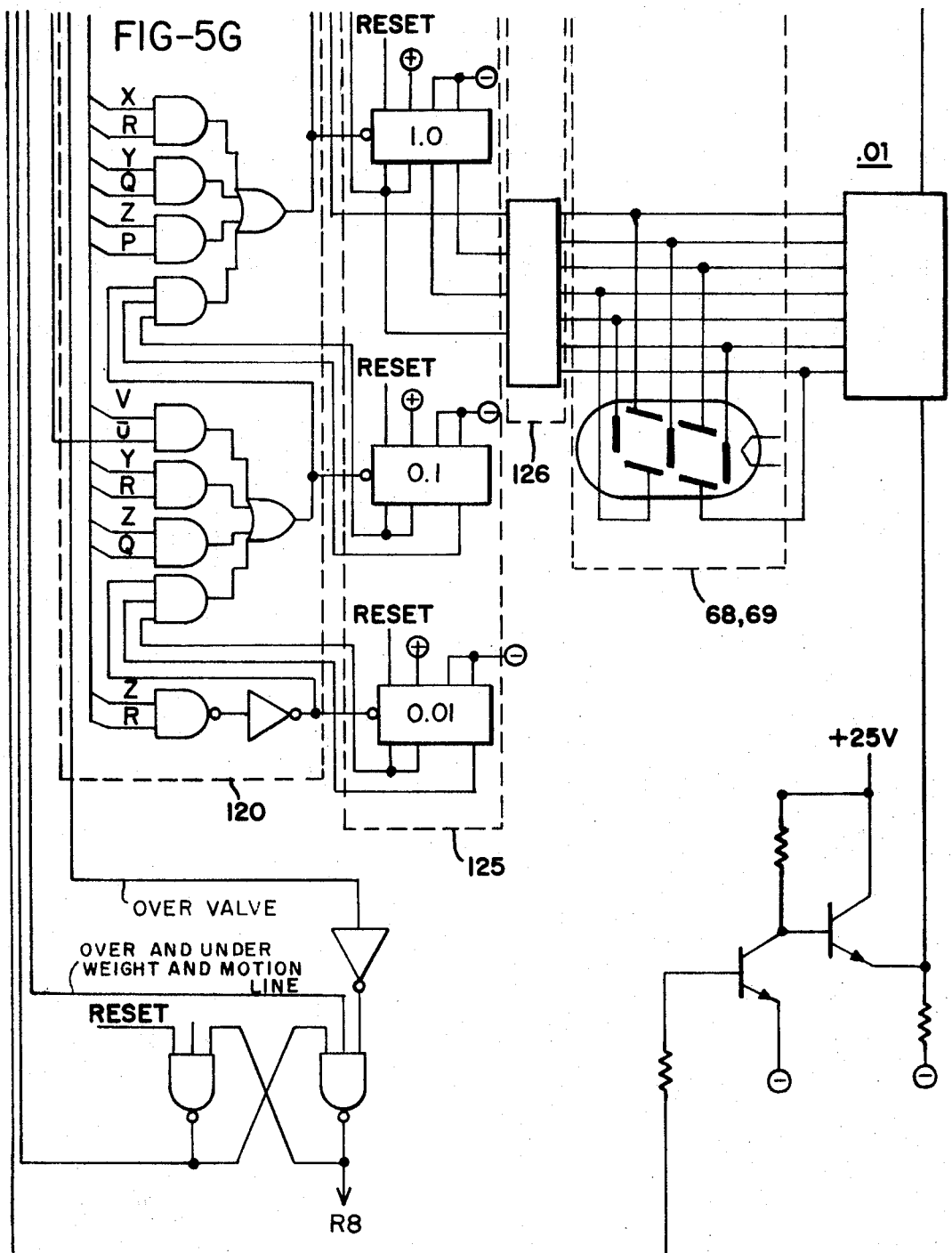

WEIGHING SCALE WITH DIGITAL DISPLAY

BACKGROUND OF THE INVENTION

This invention relates to a weighing scale of the type which provides a visual indication of the weight and value of goods placed on a scale platform. In prior art scales, charts are normally used to provide this information. These charts are moved in proportion to the weight of the goods placed on the scale platform with one column on the chart representing the weight. Other columns on the chart are divided according to the price per unit weight. By looking at the appropriate column, the total price of the goods may be determined visually by the operator.

One disadvantage of these prior art scales is that it requires the operator to interpret the total price properly, that is, he must read the proper column according to the price per unit weight, and then once the proper column is selected, determine the total value of the goods by reference to an index mark. Another disadvantage of this type of scale is in the limited number of available price per unit weight columns.

SUMMARY OF THE INVENTION

This invention relates to an improved weighing scale in which the price per unit weight and the total price of goods placed on the scale platform are displayed visually by electronic display devices. The weight of the goods is visually displayed optically.

The preferred embodiment of the scale includes an optical chart which is moved in proportion to the weight of the goods, and this chart includes both human recognizable and machine recognizable indicia respresenting weight. The human recognizable indicia is projected onto ground glass plates mounted in the front and back of the scale housing so that the total weight of the goods may be viewed both by the operator and by the customer. Since this is a continuous presentation, it may be easily determined when the scale platform reaches its balance condition.

The machine recognizable indicia is focused onto photodetectors which convert this information into electronic signals representing the weight of the goods. This electronic weight information is multiplied by price per unit weight information supplied by the operator through a keyboard. Both the price per unit weight and the total price of the goods are displayed visually by electronic readout tubes. In the preferred embodiment, the readout tubes are visible from both the front and back of the scale housing. Electronic circuitry detects motion of the scale platform and blanks out the electronic presentation so that the total price is displayed when the scale platform is in a balance condition.

Since an electronic digital display is used for both price per unit weight and total price, this information is visible from a relatively long distance and there is no requirement that the operator interpret a chart reading in order to obtain the price of the goods. Also, since many combinations of price per unit weight and weight information may be computed, there is no limitation as to these combinations except by the size of the electronic display. This provides more flexibility than previously available in prior art scales.

A preferred embodiment of the invention also includes a time delay circuit to permit the operator to enter the price per unit weight information serially through a ten key keyboard. After the time period expires, the operator may enter new information and replace the data previously stored in the computer.

The computing technique employed in the preferred embodiment is similar to that disclosed in U.S. Pat. No. 3,557,353. However, some significant differences will be apparent to those skilled in the art. For example, the weight information is not stored in shift registers but is taken directly from the photodetectors so that the computation of price per unit weight times weight is done continuously under the direction of an internal clock.

Accordingly, it is an object of this invention to provide an improved scale, especially for use in delicatessens and other similar operations, wherein the price per unit weight of goods may be entered manually by the operator into a computer and the total value of the goods computed as soon as the scale platform reaches a balanced condition, with the price per unit weight, total weight, and total price of the goods displayed visually and clearly.

These and other objects and advantages of the invention will be apparent from the following description, the accompanying drawings and the appended claims.

BRIEF DESCRIPTION OF THE DRAWINGS

FIGS. 5a–5g is a detailed electrical schematic diagram of the computing and display circuit constructed according to this invention;

FIG. 6 is a chart showing the proper arrangement of FIGS. 5a–5g to make a complete drawing; and FIG. 7 identifies some of the symbols used in FIGS. 5a–5g.

DESCRIPTION OF THE PREFERRED EMBODIMENT

Figure 1:
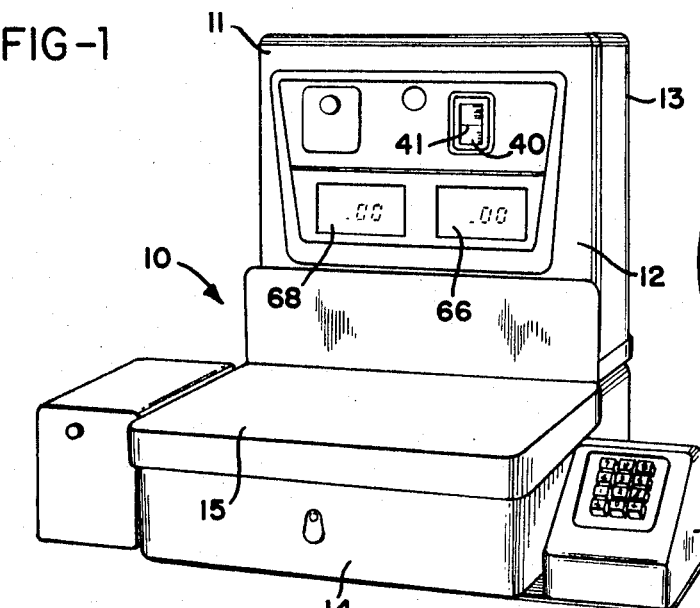
FIG. 1 is a perspective view of a weighing scale showing a keyboard, an optical display of weight, and electronic means to display visually the price per unit weight and total price of goods placed on the scale platform.

Referring now to the drawings, and particularly to FIG. 1, a weighing scale 10 includes a vertical housing 11 having a front wall 12 and a back wall 13. The scale also includes a base section 14 which supports the vertical housing and on which is mounted a horizontal scale platform 15. This platform is adapted to receive goods thereon for weighing, and is therefore mounted adjacent the lower portion of the front wall 12.

Figure 2:
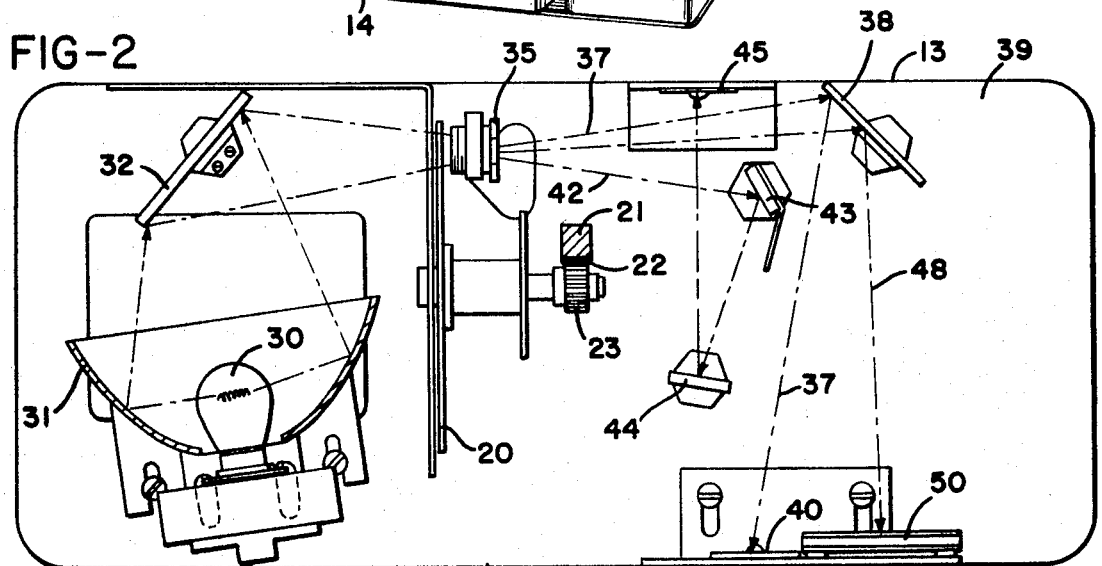
FIG. 2 is a plan view of the interior of the scale housing showing the optical paths for both the human and the machine recognizable indicia on the optical chart.

An optical chart 20 is mounted within the vertical housing and is connected by mechanical means to the scale platform 15. The scale includes springs (not shown) which permit the platform 15 to move through a distance proportional to the weight of the goods placed on the scale platform, and therefore the optical chart moves through a distance proportional to the weight of the goods. The scale platform 15 is connected to a rack 21 which, as shown in FIG. 2, includes teeth 22 which cooperate with a pinion 23 to rotate the optical chart 20.

Figure 3:
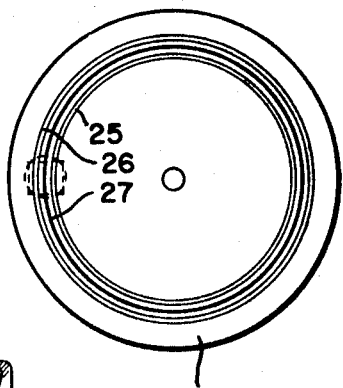
FIG. 3 is a view showing the optical chart used which contains both human and machine recognizable indicia representing the weight of the goods.

The optical chart 20 includes both human and machine readable indicia representing the weight on the scale platform. As shown in FIG. 3, the human readable indicia is located in tracks 25 and 26, while the machine readable indicia is located in a set of tracks 27. The human readable indicia includes numerals and lines which divide the unit of weight, e.g., pound, into smaller divisions. The machine readable indicia includes fourteen tracks.

Referring again to FIG. 2, the chart 20 is illuminated by a lamp 30 with the light from the lamp directed onto the chart by reflector 31 and mirror 32. The image of the indicia on the chart is focused by a lens 35 into three separate optical paths. The first optical path 37 includes a mirror 38 mounted on optical plate 39 to reflect the image from track 25 onto a ground glass plate 40 mounted on the optical plate and inside the front wall 12 of the vertical housing. This ground glass plate includes a reference mark 41 (FIG. 1) against which the human readable indicia may be referred. The second optical path 42 includes mirrors 43 and 44 to reflect the image from track 26 onto a second ground glass plate 45 mounted on the optical plate and inside the back wall 13. This provides the customer with the same human readable information representing the weight of the goods. It will be noted that the optical path 42 includes one more mirror than the path 37 and for this reason the numerals in track 26 are reversed from those in track 25.

A third optical path 48 also includes mirror 39 to reflect the image from track 27 onto a plurality of photodetectors 50 where the machine recognizable indicia is converted into an electrical representation of weight.

It may be seen that the lengths of the optical paths 37, 42 and 48 are substantially the same and therefore one lens 35 may be used to focus the weight information onto the ground glass plates and the photodetectors.

Figure 4:
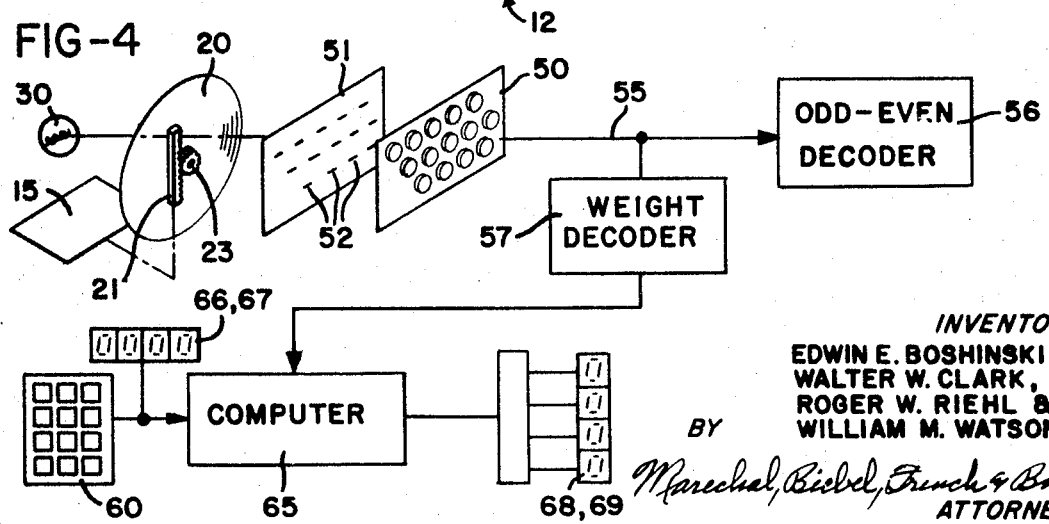
FIG. 4 is a block diagram showing the electronic circuitry used in this invention to display price per unit weight and total price.
Figure 5A:
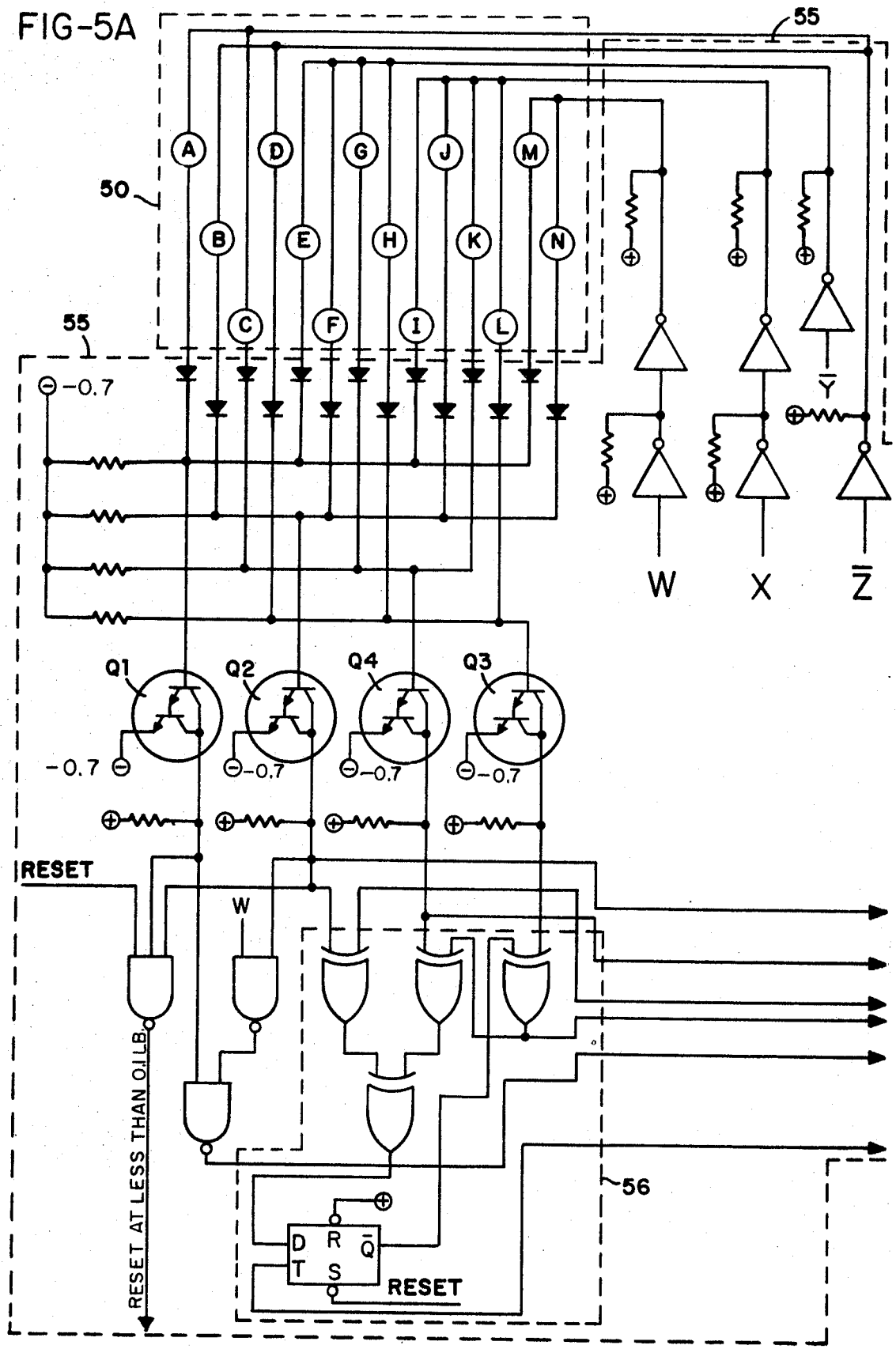
Figure 5C:
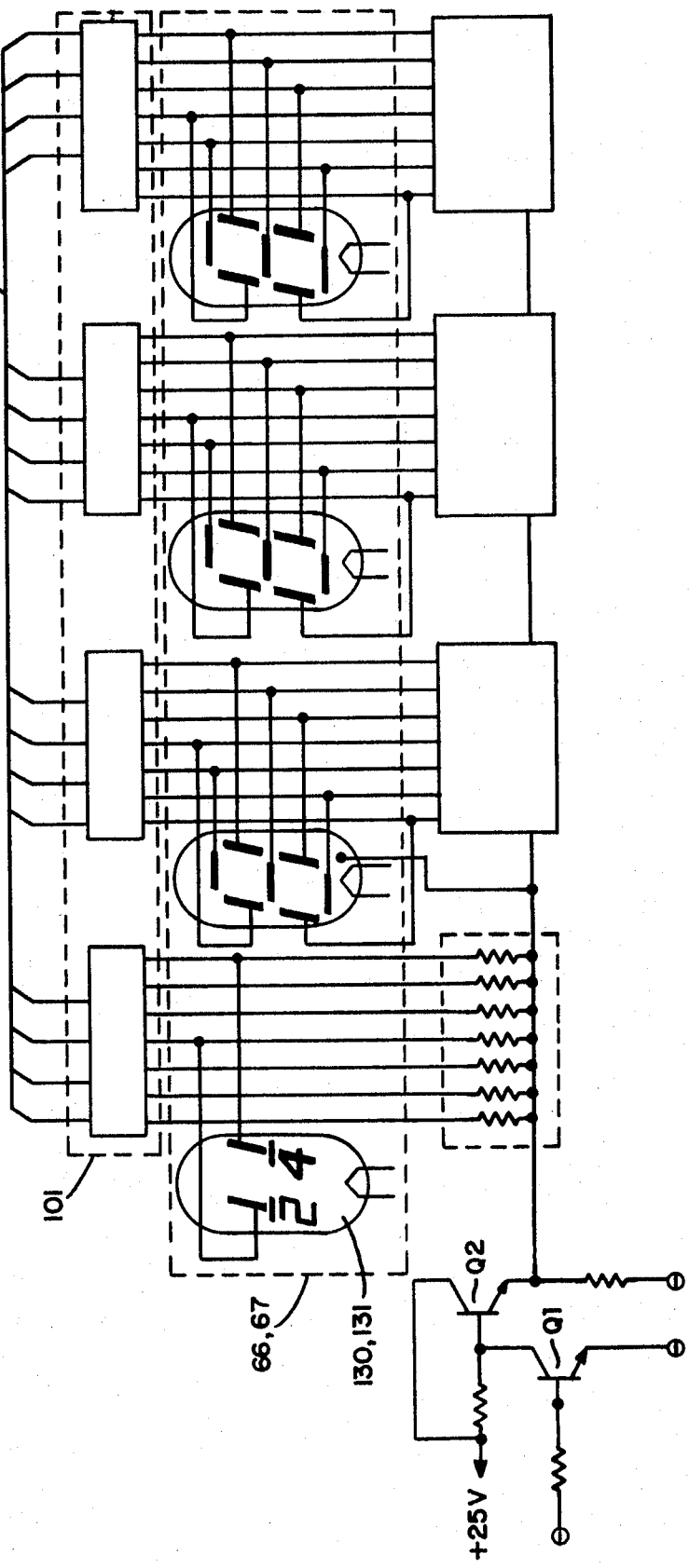
Figure 5D:
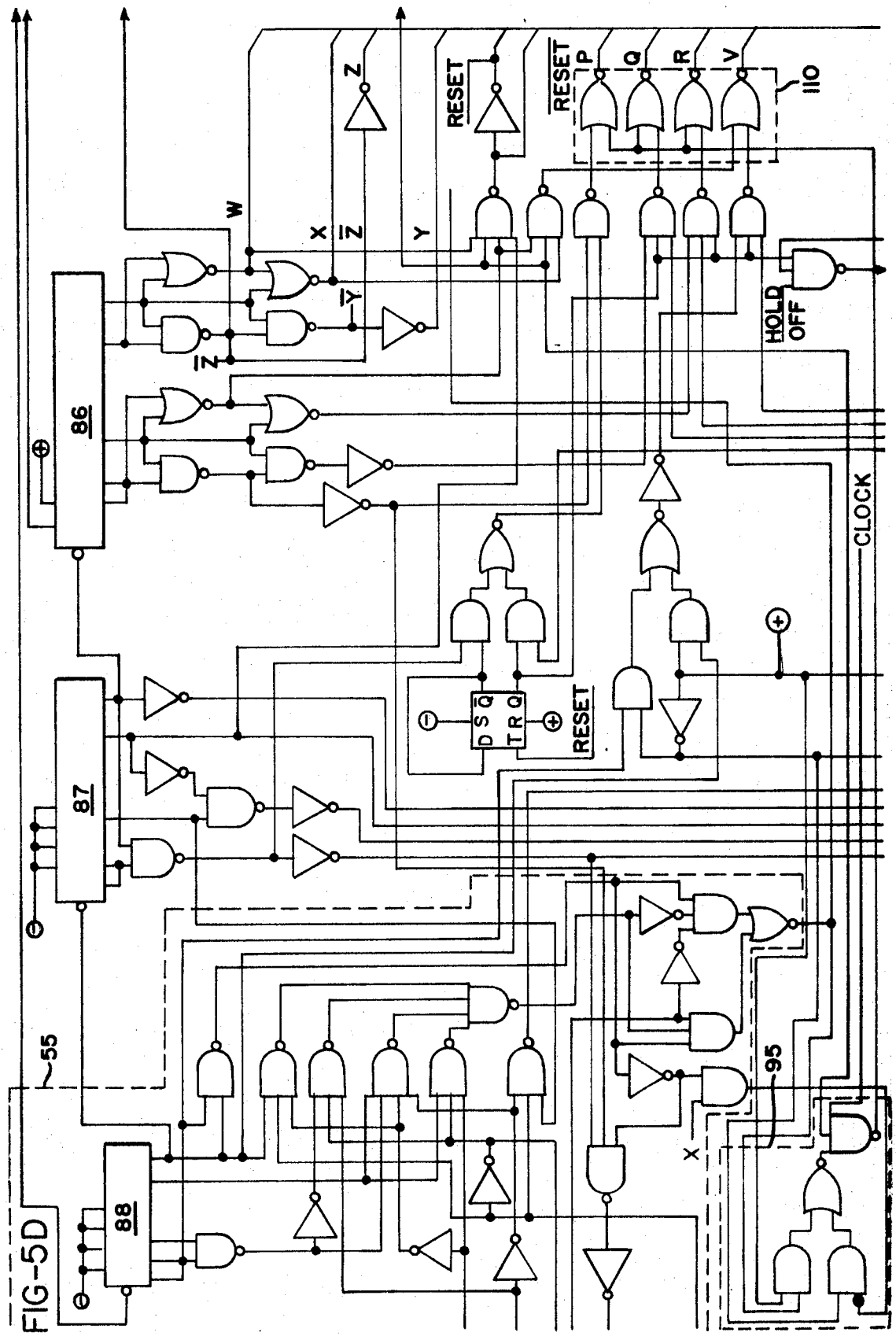

The photodetectors in the preferred embodiment of the invention are photoresistive devices, and in order to provide the necessary optical resolution, these photodetectors are exposed to the image of the track 27 through a plate 51 which includes a plurality of slits 52 cut therein which are positioned over the photodetectors, as shown diagrammatically in FIG. 4. The photodetectors 50 therefore convert this optical information into electronic signals which are then carried by a cable 55 to an odd-even decoder 56 and a weight decoder 57.

Referring to FIGS. 1 and 4, price per unit weight information is provided through a keyboard unit 60. In the preferred embodiment, this is a conventional keyboard by which price per unit weight information may be entered serially into a computer circuit 65 where it is then multiplied by the weight information to provide total price.

The price per unit weight information is displayed visually by two sets of electronic display tubes 66 and 67, each including four tubes. The total price information is displayed on two sets of tubes 68 and 69 which have their inputs connected to the computer 65. The displays 66 and 68 are mounted in the front wall 12 of the housing and are visible to the operator, while the displays 67 and 69 are mounted in the back wall 13 of the housing, and are visible to the customer.

Reference is now made to FIGS. 5a–5g, when placed together as shown in the chart in FIG. 6, form a detailed electrical schematic diagram of the computing and display circuit of this invention. FIG. 7 identifies some of the major symbols used in FIGS. 5a–5g.

The photocell circuit 50 (FIG. 5a) includes fourteen individual photocells 50A through 50N with photocells 50A-D representing the least significant digit and photocells 50M-N representing the most significant digit. Photocells 50E and 50G, in addition to representing weight, are also used by the circuit to detect any motion of the optical chart which would also represent motion of the scale platform.

The photocells 50 are connected to a decoding circuit 55 which includes a plurality of diodes and Darlington amplifiers Q1–Q4. Since the machine recognizable indicia on the optical chart 20 in the preferred embodiment includes fourteen tracks in a biguinary reflected gray code, the decoder circuit 55 includes an odd and even decoder circuit 56. As will be understood by those skilled in the art, the odd and even decoder circuit is used to remember the previous digit and this information is used to decode the indicia currently illuminating the photocells.

A clock 85 supplies clock pulses to three counter circuits 86, 87 and 88. Counter 86 is a four bit, 16 count circuit which produces an output pulse for every 1600 clock pulses. Counters 87 and 88 are decade counters which provide outputs for each 100 and 10 clock pulses, respectively. The clock 85 also includes a divider circuit 89 which, for reasons to be explained in more detail hereinafter, divides the output of the clock to the counters 86–88 by either one, two or four, depending on its input.

The output of counter 88 is combined with the decoded output of the photocells in a plurality of gates shown generally at 91, the output of which is supplied to a gate 95 which combines this series of pulses representing weight with a pulse directly from clock 85. When the divider circuit 89 divides by 1, the output of the gate 95 is a series of weight pulses which corresponds directly to the weight of the goods on the scale platform. If the divider circuit 89 divides the clock pulses by two or four, then the weight pulse output from gate 95 will be two or four times the original weight pulses.

The keyboard 60 includes a plurality of switches representing the digits 0 to 9. Also included on the keyboard are two switches marked 1/2 and 1/4. These switches are used in those scales where the price is given for either one half pound or one quarter pound. In other words, when the 1/2 switch is closed momentarily, the price per unit weight is given, for example, as: $1.29/(½) lb.

These switches are connected to a decoder circuit 100 which includes decoding diodes and a three stage shift register. It is intended in the embodiment of the invention shown herein that the maximum price per unit weight given will be $9.99, with this price information being given provided in serial form through the keyboard 60. The output of the keyboard decoder 100 is connected to a tube decoding circuit 101 which controls the illumination of the electronic display tubes 66 and 67 to provide a visual representation of the price per unit weight.

The keyboard 60 is also connected to a time delay circuit 102 which functions to reset the shift registers upon the entry of the first digit but which inhibits the resetting of the shift registers for subsequent digits supplied within the time delay period. The time delay is normally set at about two seconds and is determined by resistor KR2 and capacitor KC1. A keyboard clock 103 controls the operation of the keyboard decoder 100.

The output of the keyboard decoder 100 is also connected to a pulse generator circuit 105 which also has an input supplied to it by the counter 87. The outputs from this circuit are identified as P, Q and R and are a dynamic representation of the price per unit weight and are actually a plurality of waveforms, the lengths of which are a function of the price per unit weight.

The outputs of the pulse generator 105, representing price per unit weight, and the output of gate 95, which is a dynamic representation of weight, are applied to a gate circuit 110. The outputs of this circuit are unordered partial products representing the multiplication of weight times price per unit weight. This information, along with a weight timing signal from counter 86 is then applied to partial product gate 120, the output of which is connected to output registers 125 which, in the preferred embodiment, are decimal counting units. It will be easily seen that the output of register 125 represents the total price or value of the goods placed on the scale platform.

The output registers 125 are connected to a tube decoding circuit 126, and this circuit is in turn connected to the electronic display tubes 68, 69 which provide a visual and digital representation of price.

In the price per unit weight display tubes 66, 67, one set of tubes 130 and 131 are either off or show 1/2 or 1/4. These tubes are connected to the 1/2 and 1/4 switches on the keyboard 60 and are illuminated when the price per one half pound or one quarter pound computation is to be made. The 1/2 or 1/4 switches also control the operation of the divider circuit 89 so that the clock pulses supplied to the counters 86–88 are divided by one half or one quarter. When the divider circuit is operating, it will be apparent that two or four times the weight pulses will be supplied to the gate 110, and therefore the total price will be multiplied by two or four times, depending upon the switch closed.

The circuit shown in FIGS. 5a–5g also includes provisions for holding the digital information on the electronic display tubes after a computation is made for a time period sufficient to enable the operator to determine the digital reading. On occasion, the weight may vary slowly between two codes which will cause the last digit of the price information to vary between two numbers, and even though a motion detector is included, the motion which causes the change in weight may be insufficient to activate this motion detector. By using a hold-off circuit 135, any changes in the weight information will be done at a relatively slow rate so as not to confuse the operator.

The computing circuit shown in this drawing also includes means for preventing a display on the electronic readout tubes during the time that the scale platform is in motion so that the operator and the customer will only see the output of price on the display tubes 68 and 69 after computation has been completed and when the scale platform is at rest.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:
1. A weighing scale including
a scale platform adapted to receive goods for weighing;
means for providing electrical output signals representing the weight of the goods placed on said platform;
means for providing electrical signals representing the price per unit weight of the goods including a keyboard on which a scale operator may enter manually this information, means retaining this information until a new price per unit weight entry is made, time delay means permitting the entry of the price per unit weight information sequentially within a predetermined time delay period,
electronic means for displaying visually the price per unit weight,
electronic means for computing the total price of the goods, and
electronic means for displaying visually the total price of the goods.
2. The scale of claim 1 further including means to display optically the weight of the goods placed on said platform.
3. The scale of claim 1 further including
means responsive to said electrical output signals representing weight for producing a first output signal during motion of said scale platform,
means responsive to said electrical output signals representing weight for producing a second output signal when the weight on said scale platform is either less than a first predetermined weight or in excess of a second predetermined weight,
means responsive to the output of said electronic means for computing total price for producing a third output signal when the total price computed is in excess of a predetermined value, and
means responsive to said first, second and third output signals for preventing display of total price.
4. The scale of claim 1 further including means responsive to said electrical signals representing the weight of the goods to enter a zero value into said means for providing electrical signals representing the price per unit weight of the goods when the weight on said scale platform falls below a predetermined value.
5. A weighing scale including
a scale platform adapted to receive goods for weighing,
means for providing electrical output signals representing the weight of the goods placed on said platform,
means for providing electrical signals representing the price per unit weight of the goods,
means responsive to said electrical output signals representing weight for resetting said means for providing electrical signals representing the price per unit weight to a zero value when the weight on said scale platform falls below a predetermined weight,
electronic means for displaying visually the price per unit weight,
electronic means for computing the total price of the goods, and
electronic means for displaying visually the total price of the goods.

* * * * *